US009122271B2

(12) United States Patent
Zwanziger

(10) Patent No.: US 9,122,271 B2
(45) Date of Patent: Sep. 1, 2015

(54) METHOD FOR COLLISION-FREE TRANSFER OF A PLANT FROM AN SUBSTANTIALLY OFF MODE TO AN OPERATING MODE

(75) Inventor: Peter Zwanziger, Nürnberg (DE)

(73) Assignee: Siemens Aktiengesellschaft, Muenchen (DE)

( * ) Notice: Subject to any disclaimer, the term of this patent is extended or adjusted under 35 U.S.C. 154(b) by 850 days.

(21) Appl. No.: 13/356,085

(22) Filed: Jan. 23, 2012

(65) Prior Publication Data
US 2012/0191233 A1 Jul. 26, 2012

(30) Foreign Application Priority Data

Jan. 25, 2011 (EP) .................................. 11152004

(51) Int. Cl.
*G06F 19/00* (2011.01)
*G05B 19/418* (2006.01)
*G05B 19/04* (2006.01)
*G05B 19/18* (2006.01)
*G05B 17/02* (2006.01)

(52) U.S. Cl.
CPC .......... *G05B 19/41885* (2013.01); *G05B 17/02* (2013.01); *G05B 2219/32349* (2013.01); *G05B 2219/50104* (2013.01)

(58) Field of Classification Search
CPC ............. G05B 19/41885; G05B 17/02; G05B 2219/32349; G05B 2219/50104
USPC .......................... 700/177–178, 245, 248, 255; 901/49–50
See application file for complete search history.

(56) References Cited

U.S. PATENT DOCUMENTS

| 5,170,109 | A | * | 12/1992 | Yanagita et al. | 318/568.1 |
| 6,356,806 | B1 | | 3/2002 | Grob et al. | |
| 6,397,111 | B1 | | 5/2002 | Niwa | |
| 6,438,445 | B1 | * | 8/2002 | Yoshida et al. | 700/173 |
| 6,473,658 | B1 | | 10/2002 | Bröse et al. | |
| 7,974,737 | B2 | * | 7/2011 | Tilove et al. | 700/253 |
| 8,155,930 | B2 | * | 4/2012 | Onishi et al. | 703/2 |
| 8,374,718 | B2 | * | 2/2013 | Takahashi et al. | 700/178 |
| 2004/0250147 | A1 | * | 12/2004 | Chang | 713/323 |
| 2005/0049749 | A1 | * | 3/2005 | Watanabe et al. | 700/245 |
| 2005/0187663 | A1 | | 8/2005 | Heidemann et al. | |
| 2007/0129917 | A1 | | 6/2007 | Blevins et al. | |
| 2007/0213874 | A1 | * | 9/2007 | Oumi et al. | 700/245 |
| 2007/0299642 | A1 | * | 12/2007 | Kondo | 703/6 |
| 2008/0114492 | A1 | * | 5/2008 | Miegel et al. | 700/248 |
| 2008/0125893 | A1 | * | 5/2008 | Tilove et al. | 700/103 |
| 2008/0262820 | A1 | | 10/2008 | Nasle | |
| 2011/0153080 | A1 | * | 6/2011 | Shapiro et al. | 700/255 |
| 2011/0196533 | A1 | * | 8/2011 | Scheurer et al. | 700/255 |

FOREIGN PATENT DOCUMENTS

| CN | 1233331 | 10/1999 |
| CN | 101158872 | 4/2008 |

(Continued)

*Primary Examiner* — Ronald Hartman, Jr.
(74) *Attorney, Agent, or Firm* — Cozen O'Connor

(57) ABSTRACT

A method for collision-free transfer of a production plant from an substantially off mode to an operating mode, wherein the production plant operating state information of connected process sections required for collision-free startup of the plant is derived at least partially from simulation data of a real-time simulation tool that simulates the production plant operation parallel to the actual operation of the production plant in real-time.

5 Claims, 2 Drawing Sheets

(56) References Cited

FOREIGN PATENT DOCUMENTS

| EP | 0606649 | 7/1994 |
| EP | 1011035 | 6/2000 |
| EP | 1672451 | 6/2006 |
| WO | WO 02079885 | 10/2002 |

* cited by examiner

METHOD FOR COLLISION-FREE TRANSFER OF A PLANT FROM AN SUBSTANTIALLY OFF MODE TO AN OPERATING MODE

BACKGROUND OF THE INVENTION

1. Field of the Invention

The present invention relates to production plant automation and, more particularly, to a method for collision-free transfer of a plant from an off mode, i.e., a substantially off mode, to an operating mode.

2. Description of the Related Art

Production plants, such as automated production plants, can normally be changed over from an operating mode into a substantially off mode, which is also referred to as standby mode. Such a substantially off mode is characterized by the fact that it requires only a very small amount of power in comparison to the power required for the operating mode, which is desirable in principle with respect to the environment and operational costs.

A problem exists in that, when a plant is transferred from the substantially off mode back to the operating mode, all of the relevant operational states need to be brought to the respective same state of knowledge that existed prior to the substantially off mode, corresponding to the plant function. This requirement is to ensure collision-free startup of the plant, which relates both to dynamic and static states of connected process sections and the temporal causalities thereof. All of the foregoing, is associated with a high degree of complexity. In particular, the temporal causalities, such as the temporal interaction of individual process sections, are lost during the transition of the plant from the operating mode to the substantially off mode, for which reason the plant needs to be restarted. Correspondingly, the power saving option is usually not used during down times of production plants by transferring the production plant to the substantially off mode.

Collision-free transfer of a production plant from a completely off mode to an operating mode is associated with even greater time expenditure. Usually, the individual production plant components that are associated with the connected process sections need to first be brought into a predefined starting position to initiate the operating mode starting from this starting position.

SUMMARY OF THE INVENTION

It is therefore an object of the present invention to provide a method for ensuring rapid collision-free transfer of a production plant from an off mode, i.e., a substantially off mode, to an operating mode.

This and other objects and advantages are achieved in accordance with the in present invention by a method in which the production plant operating state information of connected process sections, which may be primary and/or secondary processes, required for collision-free startup of the plant, is derived from simulation data of a real-time simulation tool that simulates the production plant operation parallel to the actual real-time operation of the production plant.

The use of such a real-time simulation tool is advantageous to the extent that the present dynamic and static states of connected plant process sections and the temporal causalities thereof are always known based on the simulation data, i.e., even those states shortly before transfer of the production plant from the operating mode to the off mode, which enables collision-free startup of the plant. As a result, the production plant can resume the process from the point at which it was interrupted or at least just before this point. In addition, the transfer of a production plant from a substantially off mode to an operating mode due to the simulation data provided, which can be called up quickly, can occur within a very short period of time. Consequently, it is particularly possible to save costs. The production plant operating state information of connected process sections that is required for collision-free startup of the plant may be, for example, the position of all of the semi-finished workpieces in the production plant prior to the transfer from the operating mode to the off mode and/or information regarding which working cycles were interrupted during the transfer, such as all data from the last program step of a processing machine, information regarding how or at which point in time the interrupted working cycles can be resumed, information regarding the operating temperatures of the processing machines and/or the temperatures of the semi-finished workpieces that need to be reset prior to renewed startup.

In accordance with an embodiment of the present invention, the method comprises simulating the operation of the production plant in real-time using the simulation tool based on the simulation data that are generated from production plant operating state information that was transmitted in real-time from the production plant to the simulation tool, transferring the production plant to the substantially off mode, deriving the production plant operating state information required for collision-free startup of the production plant from simulation data using the simulation tool and storing this information in the simulation tool as restart information, transmitting the restart information from the simulation tool to the production plant, i.e., as part of a synchronization of simulation tool and production plant, and transferring the production plant from the substantially off mode to the operating mode using the transmitted restart information.

The simulation tool may be, for example, one that is based on the concept of the "Digital Factory". A Digital Factory represents a virtual image of a real production plant or factory and serves the purpose of simulating production processes and optimizing operating cycles. The concept of the Digital Factory is used both as a basis for the planning of real production and therefore prior to initial startup of a production, and during the production for process optimization.

In accordance with an alternative embodiment of the present invention, the method comprises simulating the operation of the production plant in real-time using the simulation tool, with the simulation being performed based on the simulation data that were generated from production plant operating state information that is transmitted in real-time from the production plant to the simulation tool, deriving production plant operating information required for collision-free startup of the production plant from simulation data using the simulation tool at regular time intervals and storing this information in the simulation tool as restart information, transferring the production plant to an off mode, transmitting the restart information from the simulation tool to the production plant, i.e., as part of a synchronization of simulation tool and production plant, when the plant is switched on again, and transferring the production plant from the off mode to the operating mode using the transmitted restart information, where the production plant and the simulation tool are fed via separate power supplies.

While a production plant can be set up for the substantially off mode prior to being transferred from an operating mode to a substantially off mode, this is not always possible when the production plant is completely shut down, such as when actuating an emergency stop device of the plant. In order nevertheless to be furnished with the possibility of bringing the production plant or the individual process sections back into operation precisely in that state in which they were before being shut down, in the presently contemplated embodiment of the method in accordance with the invention, the production plant operating information required for collision-free startup of the plant is derived at regular time intervals from the simulation tool and stored as restart information. Consequently, once the plant has been switched off completely, the most recently stored set of restart information can be used, for example, for renewed startup of the plant or the individual process sections. As a result, time and costs can be saved.

Advantageously, a monitoring system monitors changes in the state of the plant during the off mode and signals such changes in states to the simulation tool, with the monitoring system and the production plant being fed via separate power supplies. The use of such a monitoring system makes it possible to ensure that the state of the plant remains unchanged while it is in the off mode, such as by virtue of workpieces or the like being removed, which could represent a problem during renewed startup of the production plant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages will become apparent from the description below relating to methods for collision-free transfer of a plant from a substantially off mode to an operating mode in accordance with embodiments of the present invention with reference to the attached drawing, in which.

DETAILED DESCRIPTION OF THE PRESENTLY PREFERRED EMBODIMENTS

Figure 1:
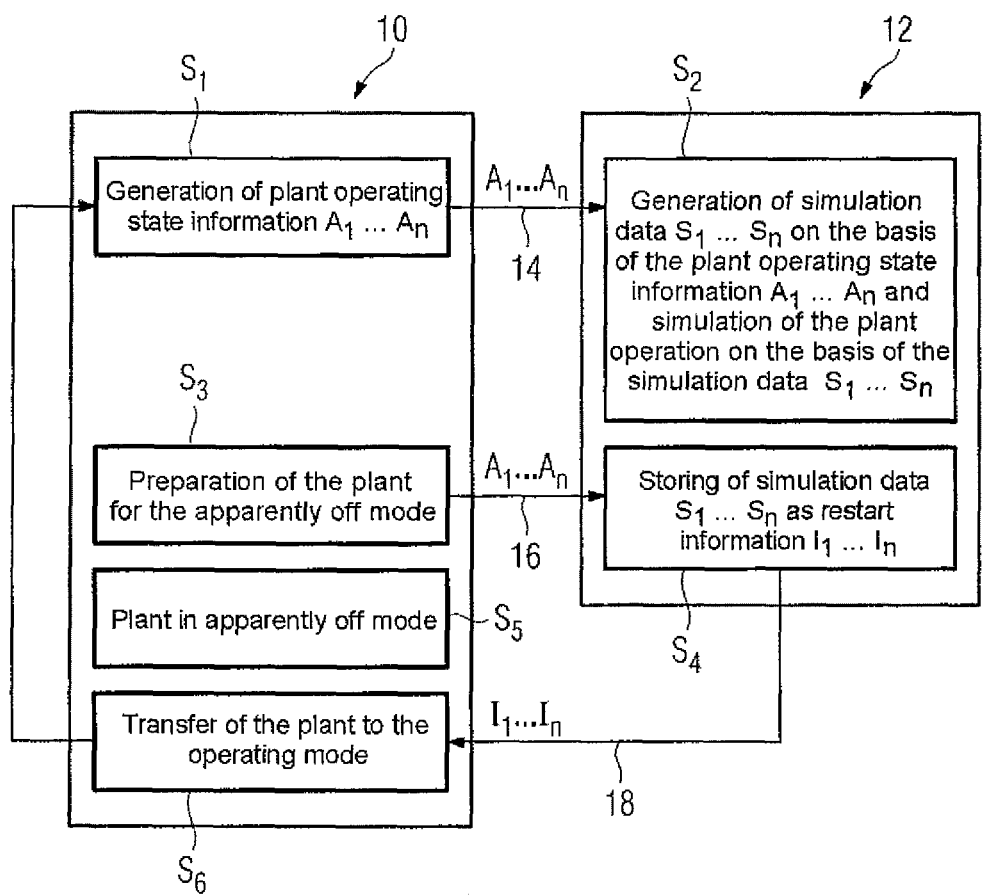
FIG. 1 is a flow chart of a method in accordance with a first embodiment of the present invention.

FIG. 1 shows, schematically, a production plant 10, which can be transferred, with the aid of the method in accordance with the invention, in a collision-free manner from a substantially off mode to an operating mode, and a simulation tool 12, which performs a real-time simulation of the operation of the plant 10 in parallel.

In the operating mode, in a step S1 production plant operating state information $A_1 \ldots A_n$ is generated continuously by the plant 10, where the information represents the dynamic and static states of connected process sections. The process sections are primary and secondary processes. The primary processes are substantially the actual processing processes for a workpiece, whereas the secondary processes include, for example, conveying processes, air-conditioning processes or the like, which are required in addition to the processing processes for achieving proper production. The production plant operating state information is transmitted in real-time to the simulation tool 12, which is illustrated by the arrow 14. In a step S2, simulation data $S_1 \ldots S_n$ are generated in the simulation tool 12 based on the transmitted plant operating state information, where the simulation data is used to simulate the operation of the production plant 10 in real-time. Correspondingly, the present operating state of the production plant 10 is known to the simulation tool 12 at any point in time with reference to the required dynamic and static states of the connected process sections and the temporal causalities thereof.

If the production plant 10 is intended to be transferred from the operating mode to a substantially off mode, the production plant 10 is prepared for the substantially off mode in a step S3. Here, the production plant operating state information, at the time of transfer of the production plant 10 from the operating mode to the substantially off mode $A_1 \ldots A_n$, is assigned and transmitted to the simulation tool 12, which is represented by the arrow 16. In a step S4, simulation data $S_1 \ldots S_n$ are then generated based on the transmitted production plant operating state information $A_1 \ldots A_n$, and these simulation data serve as reliable restart information $I_1 \ldots I_n$ and are stored in the simulation tool 12 together with the temporal causalities thereof. Thereupon, the production plant 10 transfers to the substantially off mode in step S5. While the production plant 10 is in the substantially off mode, no production plant operating state information $A_1 \ldots A_n$ is transmitted to the simulation tool 12, since the dynamic and static states of the connected process sections do not change, and nor do the temporal causalities thereof. The restart information $I_1 \ldots I_n$ is backed up by the simulation tool 12 during the substantially off mode.

If the production plant 10 is now intended to be transferred from the substantially off mode back to the operating mode in a step S6, the restart information $I_1 \ldots I_n$ stored in the simulation tool 12 is transmitted to the production plant 10 as part of a synchronization, which is represented by the arrow 18. Correspondingly, the production plant 10 is brought back to the state of knowledge prior to the transfer of the production plant 10 from the operating mode to the substantially off mode corresponding to step S3 within a short period of time with respect to the dynamic and static states of the connected process sections and the temporal causalities thereof. The production plant 10 can then be restarted quickly and without collision and returned to step S1.

Figure 2:
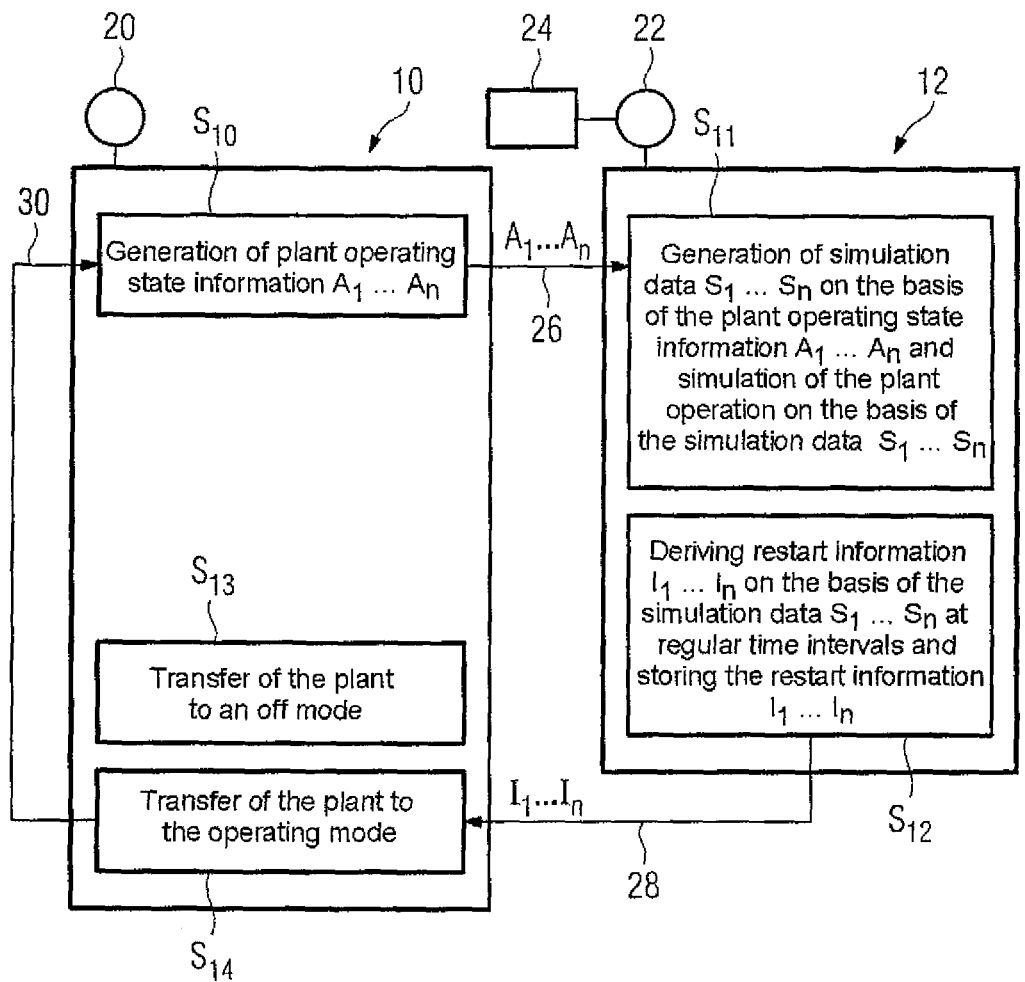
FIG. 2 is a flow chart of a method in accordance with a second embodiment of the present invention.

FIG. 2 shows, schematically, a production plant 10 that can be transferred from an off mode to an operating mode without collision with in accordance with an alternative embodiment of the method in accordance with the invention, and a simulation tool 12, which simulates the operation in the production plant 10 in real-time parallel thereto. Here, the production plant 10 is fed via a power source 20, and the simulation tool 12 is supplied with power via a separate power source 22, to which a monitoring system 24 is also connected.

In the operating mode, production plant operating state information $A_1 \ldots A_n$ is generated continuously by the production plant 10 in a step S10, as has already been described above with reference to FIG. 1, and this plant operating state information $A_1 \ldots A_n$ represents the dynamic and static states of connected processes. The production plant operating state information is transmitted in real time to the simulation tool 12, which is represented by the arrow 26. In a step S11, simulation data $S_1 \ldots S_n$ are generated in the simulation tool 12 based on the transmitted production plant operating state information, and this simulation data are used to simulate the operation of the production plant 10 in real-time. Correspondingly, the present operating state of the production plant 10 with respect to the dynamic and static states of the connected process sections and the temporal causalities thereof are known to the simulation tool 12 at any point in time. The process sections are in this case primary processes and secondary processes.

In a step S12, restart information $I_1 \ldots I_n$ is derived in the simulation tool 12 during operation of the production plant 10 based on the simulation data $S_1 \ldots S_n$ at regular time intervals and stored as restart information $I_1 \ldots I_n$ in the simulation tool 12. If the production plant 10 is now transferred to an off mode in a step S13, such as by actuation of an off switch or an emergency stop device, the production plant 10 transfers to the off mode. While the production plant 10 is in the off mode, no production plant operating state information $A_1 \ldots A_n$ is transmitted to the simulation tool 12 since the dynamic and static states of the connected process sections do not change, and nor do the temporal causalities thereof.

If the production plant 10 is now transferred from the off mode back to the operating mode in a step S14, the restart information $I_1 \ldots I_n$ stored in the simulation tool 12 is transmitted to the production plant 10 as part of a synchronization, which is represented by the arrow 28. The restart information $I_1 \ldots I_n$ is in this case that restart information which was most recently derived and stored in step S12. Correspondingly, the production plant 10 is brought back to the state of knowledge prior to the transfer of the production plant 10 from the operating mode to the off mode corresponding to step 13 within a short period of time in respect of the dynamic and static states of the connected process sections and the temporal causalities thereof. The production plant 10 can then be started up again quickly and without collision and returned to step S10, as indicated by arrow 30.

While the production plant 10 is in the off mode, the monitoring system 24 monitors changes in state of the production plant 10. For this purpose, the monitoring system 24 can have devices, such as cameras or sensors. If a change in state of the production plant 10 is detected by the monitoring system 24, such as the removal of a workpiece, this change in state is signaled to the simulation tool 12 because the change in state can represent a problem when transferring the production plant 10 back to the operating mode in step S14. The change in state is assessed in the simulation tool 12. If this should represent a problem, corresponding countermeasures can be taken, such as the emission of a fault message or the like.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for collision-free transfer of a production plant from an off mode into an operating mode, the method comprising:

simulating operation of the production plant in real-time using the simulation tool parallel to actual operation of the production plant in real-time, said simulation being performed based on simulation data generated from plant operating state information transmitted in real-time from the production plant to the simulation tool;

deriving production plant operating state information of connected process sections required for collision-free startup of the production plant from the simulation data of the real-time simulation tool using the simulation tool and storing this information in the simulation tool as restart information;

transferring the plant to an off mode;

transmitting the restart information from the simulation tool to the production plant as part of a synchronization of simulation tool and production plant; and transferring the production plant from the off mode to the operating mode using the transmitted restart information;

wherein the simulation tool is based on a Digital Factory concept.

2. The method of claim 1, wherein the off mode is a substantially off mode.

3. A method for collision-free transfer of a production plant from an off mode into an operating mode, the method comprising:

deriving production plant operating state information of connected process sections required for collision-free startup of the production plant from simulation data of a real-time simulation tool which simulates the production plant operation parallel to actual operation of the production plant in real-time;

simulating the operation of the production plant in real-time using the simulation tool, the simulation being performed based on simulation data generated from production plant operating state information transmitted in real-time from the plant to the simulation tool;

deriving plant operating information required for collision-free startup of the production plant from simulation data using the simulation tool at regular time intervals and storing this information in the simulation tool as restart information;

transferring the plant to the off mode;

transmitting the restart information from the simulation tool to the production plant, as part of a synchronization of the simulation tool and the production plant, when the production plant is re-switched on; and transferring the production plant from the off mode to the operating mode using the transmitted restart information, the production plant and the simulation tool being fed via separate power supplies.

4. The method as claimed in claim 3, further comprising:

monitoring, by a monitoring system, changes in a state of the production plant during the off mode; and indicating the changes in the state of the production plant to the simulation tool, the monitoring system and the plant being fed via the separate power supplies.

5. The method of claim 4, wherein the off mode comprises a substantially off mode.

* * * * *